United States Patent Office 3,381,003
Patented Apr. 30, 1968

3,381,003
3 - KETO - 13β - ALKYL - 17β - ACETYL - GONA - 4-ENE-17α-OL COMPOUNDS AND PROCESSES OF PREPARING THEM
Arthur A. Patchett, Cranford, and Thomas B. Windholz, Westfield, N.J., assignors to Merck & Co., Inc., Rahway, N.J., a corporation of New Jersey
No Drawing. Filed June 1, 1965, Ser. No. 460,487
16 Claims. (Cl. 260—239.55)

ABSTRACT OF THE DISCLOSURE

The invention disclosed herein relates to novel intermediate compounds useful in preparing novel steroid compounds of the gonane series, novel steroid compounds of the gonane series prepared from the novel intermediate compounds, and novel processes for preparing the intermediate and steroid compounds of the gonane series.

More particularly, this invention relates to a novel process for the synthesis of 3-keto-13β-alkyl-17β-acetyl-gona-4-en-17α-ol compounds having 8β, 9α, and 14α-hydrogen atoms, and acylates thereof and 3-keto-13β-alkyl-17β-acetyl-gona-4,9-dien-17α-ol compounds having 8β and 14α-hydrogen atoms, and acylates thereof, starting with known 3 - alkoxy - 13β-alkyl-gona-1,3,5(10)-trien-17-one compounds having 8β, 9α, and 14α-hydrogen atoms, or such compounds prepared by known procedures from known 3-alkoxy - 13β - alkyl-gona-1,3,5(10),8,14-pentaen-17-one compounds. In this synthesis, 3-alkoxy-13β-alkyl-gona-1,3,5(10)-trien-17-one is reacted first with potassium acetylide and then with acetic anhydride to introduce an α-ethynyl-β-acetoxy configuration at C–17, and then with bromoacetamide to convert the 17α-ethynyl to 17α-dibromoacetyl followed by debromination with zinc dust and acetic acid to form the corresponding 17α-acetyl radical. Reaction of this 17α-acetyl-17β-acetoxy derivative with calcium in liquid ammonia results in epimerization at C–17 with loss of the 17β-hydroxyl to form 3-alkoxy-13β-alkyl-17β-acetyl-gona-1-3,5(10)-triene; a 17α-hydroxy radical is then introduced by reaction of the intermediate enol acetate with perpenzoic acid, followed by hydrolysis. The keto group in the 17β-acetyl side chain is then protected by conversion to the ethylene ketal, the aromatic ring A is reduced with lithium in liquid ammonia, and the 3-alkoxy-Δ2,5(10) intermediate is converted by hydrolysis with a weak organic acid to the corresponding 3-keto-Δ5(10) derivative which (1) upon reaction with a strong acid forms 3-keto-13β-alkyl-17β-acetyl-gone-4-en-17α-ol or (2) upon reaction with bromine in pyridine followed by reaction with strong acid forms 3-keto-13β-alkyl-17β-acetyl-gona-4,9-dien-17α-ol. This invention also relates to novel intermediate compounds, more particularly, 3-alkoxy-13β-alkyl-17β - acetyl-gona-1,3,5(10)-triene compounds, 3-alkoxy-13β - alkyl - 17β-acetyl-gona-1,3,5(10)-triene enol acetate compounds, 3 - alkoxy - 13β-alkyl-17β-acetyl-gona-1,3,5 (10) - trien - 17α-ol compounds, 3-alkoxy-13-alkyl-17β-(1,1 - ethylenedioxyethylene) - gona - 1,3,5(10)-trien-17α- of compounds, 3 - alkoxy - 13β-alkyl-17β(1,1-ethylenedioxyethylene) - gona - 2,5(10) - dien-17α-ol compounds, 3-keto - 13β - alkyl - 17β-(1,1-ethylenedioxyethylene)-gon-5(10)-en-17α-ol compounds, and 3-keto-13β-alkyl-17β-(1, 1 - ethylenedioxyethylene)-gona - 4,9 - dien - 17α-ol compounds and to novel 3-keto-13β-alkyl-17β-acetyl-gon-4-en-17α of compounds having 8β, 9α, and 14α-hydrogen atoms, and acylates thereof and 3-keto-13β-alkyl-17β-acetyl-gona-4,9-dien-17α-ol compounds having 8β and 14α-hydrogen atoms, and acylates thereof which have the following chemical formulae:

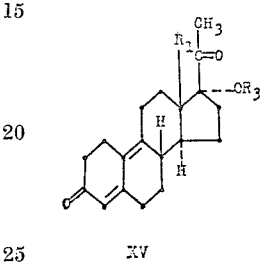
XV

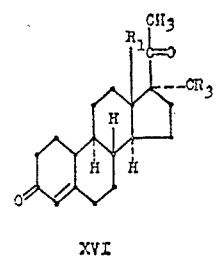
XVI wherein $R_1$ is a lower alkyl having not more than five carbon atoms, more particularly, methyl, ethyl, normal-propyl, isopropyl, normal butyl, isobutyl, normal-pentyl, and isopentyl, and $R_3$ is hydrogen or lower acyl.

The novel compounds of this invention have utility as progestational agents and because of this property they may be used to regulate the estrus cycle in domestic animals and in cases of menstrual disturbances may be used to re-establish the normal relationships between the anteriorpituitary, ovary and endometrium which are present in a normal estrus cycle. They may also be used to synchronize the estrus cycle of a herd or colony of domestic animals or to chronically suppress estrus in domestic animals. When used for these purposes, the novel compounds may be supplied together or in succession with an estrogenic hormone.

Because of the progesterone-like effects of the novel compounds of this invention, they affect the secretion of gonadotropins and thus act to regulate ovulation and endometrial and placental development. When combined with estrogens or androgens, the novel compounds of this invention reduce fertility. The novel compounds of this invention also have utility in correcting disorders such as dysmenorrhea, amenorrhea, threatened abortion, endometriosis, and the like.

The novel compounds of this invention may be administered orally or parenterally and for this purpose a wide variety of oral or parenteral dosage forms may be used in which they may be present singly, or in admixture with another active ingredient, such as an estrogen. In the various dosage forms, they can be combined with an inert solid diluent or dissolved, dispersed, or suspended in a suitable liquid carrier. When combined with an inert solid diluent, they may be in suitable dosage unit form, more particularly in the form of a tablet, powder, capsule or the like. When combined with a liquid diluent, the composition may be in the form of a solution, emulsion, suspension or the like. The novel compounds of this invention may also be formulated into an ointment, cream, lotion, or the like, which is suitable for topical administration, and in this form they may be combined with an additional active ingredient, such as an antibiotic, germicide, or the like.

The synthesis may be represented by the following series of reaction steps, wherein the compounds are designated by chemical formulae in which $R_1$ is a lower alkyl radical having not more than five carbon atoms, more particularly, methyl, ethyl, normal propyl, isopropyl, normal butyl, isobutyl and isopentyl, and $R_2$ is a lower alkyl radical, preferably methyl.

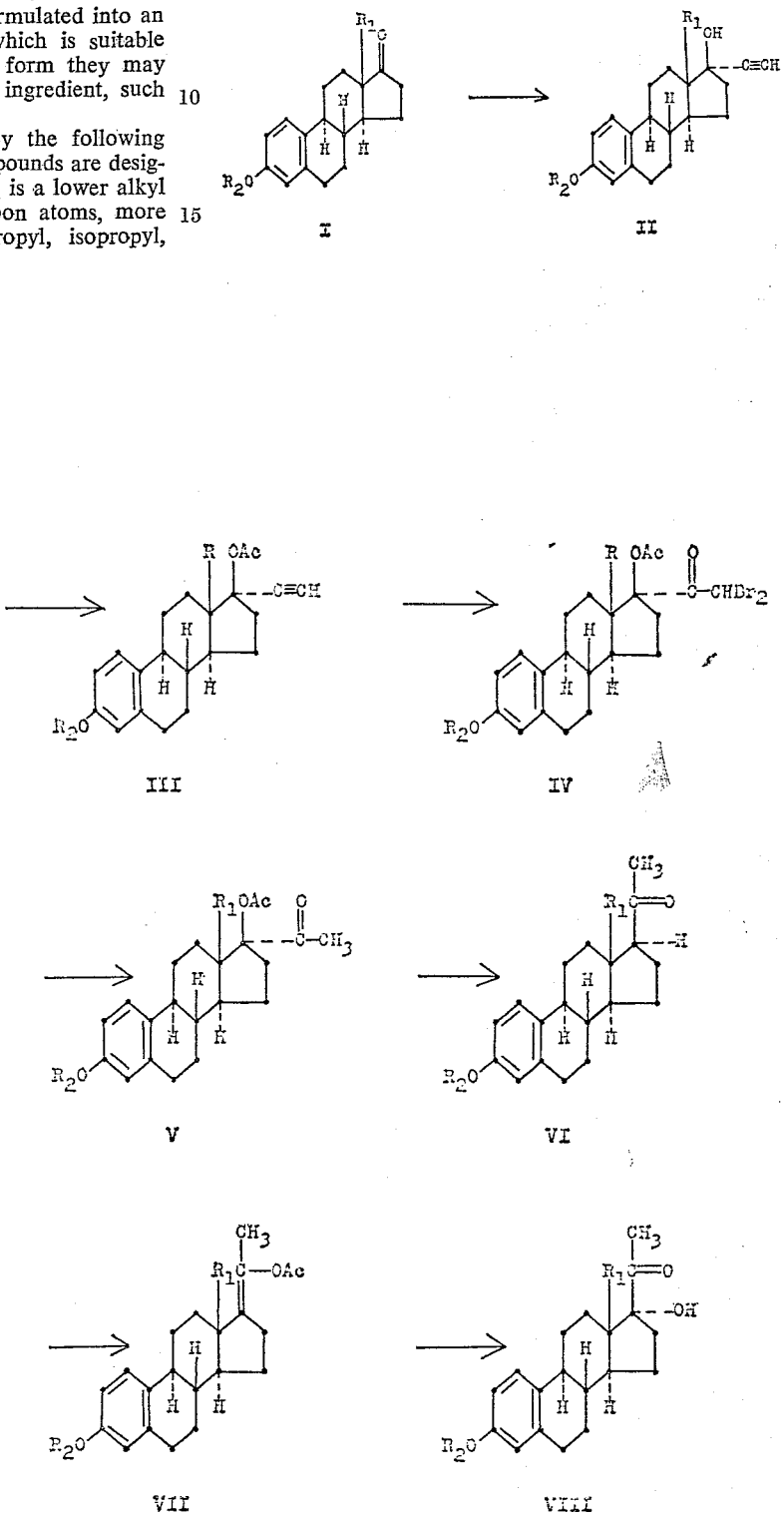

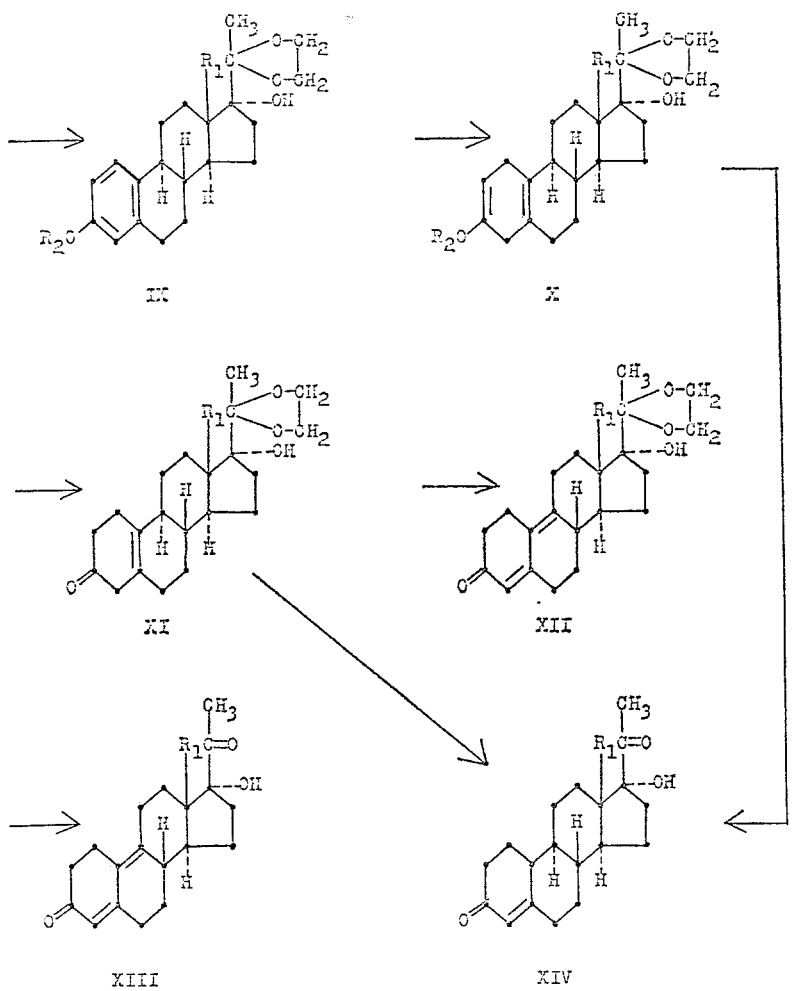

Compounds XIII and XIV are acylated to provide Compounds XV and XVI, wherein $R_3$ is lower acyl.

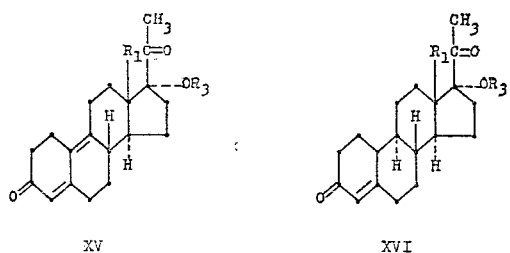

3 - alkoxy - 13β - alkyl - gona - 1,3,5(10) - trien - 17 - one (Compound I) is the starting material for the synthesis of the novel 3 - keto - 13β - alkyl - 17β - acetyl-gon - 4 - en - 17α - ol compounds and acylates thereof and 3 - keto - 13β - alkyl - 17β - acetyl - gona - 4,9 - dien-17α - ol compounds and acylates thereof.

The first step of the synthesis is ethynylation of Compound I in an alcohol solution containing dissolved acetylene and potassium metal. For example, Compound I is added to a saturated acetylene solution prepared by passing a stream of acetylene gas over the surface of a stirred solution of potassium in a lower aliphatic alcohol, such as tertiary - amyl alcohol, and anhydrous ethyl ether, which is maintained at a temperature of about 0° C. until the solution is saturated with acetylene gas. After the addition of Compound I is complete, acetylene gas is passed over the reaction mixture for an additional period of from three to four hours while the temperature is maintained at 0° C. and then for about eighteen hours while the temperature is kept at room temperature. Ten percent aqueous ammonium chloride solution is then added to the reaction mixture and the tertiary - amyl alcohol is removed by steam distillation. 3 - alkoxy - 13β-alkyl - 17α - ethynyl - gona - 1,3,5(10) - trien - 17β - ol (Compound II) precipitates as the tertiary - amyl alcohol is distilled off and is removed by filtration.

Compound II is acetylated in a second step to provide 3 - alkoxy - 13β - alkyl - 17α - ethynyl - gona - 1,3,5(10')-trien - 17β - ol acetate (Compound III). Acetylation may be accomplished by allowing Compound II to stand in acetic anhydride containing para - toluenesulphonic acid, distilling off almost all of the acetic anhydride, adding water in an amount sufficient to convert the remaining acetic anhydride to acetic acid, adding sufficient aqueous sodium hydroxide solution to neutralize the acetic acid, extracting with ether, drying the ether extract over anhydrous sulfate and evaporating the ether. The residue is Compound III.

The third step is the bromination of Compound III with N - bromoacetamide. Bromination is conveniently accomplished by adding N - bromoacetamide to a solution of Compound III in an organic solvent, such as tertiary - butyl alcohol containing a small amount of water. The solution is stirred and 3 - alkoxy - 13β - alkyl - 17α-dibromoacetyl - gona - 1,3,5(10) - trient - 17β - ol acetate (Compound IV) begins to crystallize from the reaction mixture within a few minutes. After crystallization of Compound IV is complete, water is added, the reaction mixture is cooled to about 0° C. and Compound IV is removed by filtration.

Compound IV is debrominated in a fourth step by the use of zinc dust and acetic acid. Debromination of Compound IV is conveniently accomplished by refluxing a stirred solution of Compound IV in acetic acid containing sodium acetate, water and zinc dust for about fifteen minutes. The reaction mixture is filtered to remove any unreacted zinc and the product is precipitated by the addition of water and removed by filtration. The debrominated product is 3 - alkoxy - 13β - alkyl - 17α - acetyl - gona-1,3,5(10) - trien - 17β - ol acetate (Compound V).

Compound V is converted in a fifth step to 3 - alkoxy - 13β - alkyl - 17β - acetyl - gona - 1,3,5(10) - trien (Compound VI) by treatment with calcium in liquid ammonia. For example, a solution of Compound V in an inert solvent, such as dry dioxane, is added to a solution of calcium metal in liquid ammonia with stirring at room temperature. A lower aliphatic alcohol, such as methanol, is then added and subsequent to this, ammonium chloride is added. The ammonia is allowed to evaporate and the reaction mixture is diluted with water. The solid which precipitates is Compound VI. Compound V may also be converted to Compound VI by refluxing Compound V in solution in glacial acetic acid containing zinc dust for about twenty-four hours, cooling, filtering the reaction mixture and concentrating the filtrate to a small volume. To isolate the product, the concentrate is diluted with ether, the ether solution is washed with dilute sodium hydroxide and then with sodium chloride solution until the washings are neutral. The solution is dried over sodium sulfate and the ether is removed under reduced pressure. The residue is Compound VI.

As a sixth step, Compound VI is converted to the enol acetate of 3 - alkoxy - 13β - alkyl - 17β - acetyl - gona-1,3,5(10) - triene (Compound VII) by treating Compound VI with acetic anhydride containing para - toluenesulfonic acid. For example, by allowing a solution of Compound VI in acetic anhydride containing para - toluenesulfonic acid to stand at room temperature for about three hours and then removing most of the acetic anhydride by distillation under reduced pressure. To isolate the enol acetate, the residual solution is chilled, water is added and Compound VII is extracted from the reaction mixture with ether. The ether extract is washed with sodium bicarbonate solution and with water, dried over sodium sulfate, and the ether is removed by distillation under reduced pressure. The residue is Compound VII and may be purified by dissolving in benzene and passing through a column of aluminum oxide.

Compound VII is converted in a seventh step to a 3-alkoxy - 13β-alkyl-17β-acetyl-gona-1,3,5(10)-trien-17α-ol (Compound VIII) by oxidation with perbenzoic acid to form an intermediate 17α,20-epoxide and saponifying the reaction product without isolation of the intermediate epoxide. The oxidation may be conducted by dissolving Compound VII in a hydrocarbon solvent, such as benzene, containing perbenzoic acid in solution, and allowing the solution to stand with sufficient cooling to keep the temperature only slightly above room temperature. The reaction solution is diluted with ether, the benzene-ether solution is washed with acidified sodium bisulfite solution, water, potassium hydroxide solution and again with water. The solvents are removed by distillation under reduced pressure. Saponification may be accomplished by dissolving the residue in ethanol, adding aqueous sodium hydroxide solution, and allowing the reaction mixture to stand at room temperature. Compound VIII may be isolated by diluting the reaction solution with ether, separating the ether fraction, washing with water until the washings are neutral, drying over sodium sulfate, and evaporating to dryness.

In an eighth step, Compound VIII is converted to 3-alkoxy - 13β - alkyl - 17β-(1,1-ethylenedioxyethylene)-gona-1,3,5(10)-trien-17α-ol (Compound IX) by refluxing with ethylene glycol and paratoluenesulfonic acid in solution in a hydrocarbon solvent, such as benzene, under nitrogen, a water separator being used to remove the water from the distillate. Compound IX may be isolated by cooling the reaction mixture and adding saturated aqueous sodium bicarbonate solution. The benzene layer is separated, washed with water, dried over anhydrous sodium sulfate and the benzene is removed by distillation under reduced pressure. The residue is Compound IX.

In a tenth step, Compound IX is reduced to 3-alkoxy-13β - alkyl - 17β - (1,1-ethylenedioxyethylene)-gona-2,5(10)-diene-17α-ol (Compound X). For example, a solution of Compound IX in a dry inert solvent, such as dioxane, is added to a solution of lithium or sodium in liquid ammonia without external cooling. The reaction mixture is stirred for about one hour and methanol is added dropwise over a period of fifteen minutes followed by the addition of finely divided lithium. To isolate the product, the ammonia is allowed to evaporate and sufficient water is added to precipitate the reaction product. Compound X is removed by extraction with ether, drying the ether extract over anhydrous sodium sulfate, and removing the ether by distillation.

Compound X is converted in an eleventh step to 3-keto - 13β - alkyl - 17β-(1,1-ethylenedioxyethylene)-gon-5(10)-en-17α-ol (Compound XI) by treatment of Compound X with a weak organic acid, such as acetic or oxalic acid. This is conveniently accomplished by allowing Comopund X to stand at room temperature for several hours in an aqueous solution of oxalic or acetic acid in a solvent, such as ethanol or dioxane. Compound XI may be isolated by pouring the reaction mixture into an iced sodium bicarbonate solution, allowing it to stand until the mixture is basic and extracting with benzene. The benzene extract is washed with water until neutral, dried over anhydrous potassium carbonate, and the solvent is removed by distillation under reduced pressure. The residue is Compound XI.

Compound XI is converted in a twelfth step to a 3-keto - 13β - alkyl - 17β - (1,1-ethylenedioxyethylene)-gona-4,9-dien-17α-ol (Compound XII) by treatment with approximately one equivalent of bromine in pyridine solution. Compound XII may be isolated by pouring the reaction mixture into ice water after the reaction mixture has been allowed to stand at room temperature for several hours. Compound XII may be recovered by extraction with ether, drying the ether extract over anhydrous sodium sulfate and removing the ether by distillation. The residue is Compound XII.

Compound XII is converted to 3-keto-13β-alkyl-17β-acetyl-gona-4,9-dien-17α-ol (Compound XIII) by treatment with methanolic hydrochloric acid. The methanolic hydrochloric acid may contain about 5 ml. of concentrated hydrochloric acid for each 100 ml. of methanol. The addition of water to the reaction mixture precipitates Compound XIII, which is then removed by filtration.

Compound X may be converted to 3-keto-13β-alkyl-17β-acetyl-gon-4-en-17α-ol (Compound XIV) by treatment with methanolic hydrochloric acid according to te same reaction conditions as are used in the conversion of Compound XII to Compound XIII.

Compound XIV may also be prepared by allowing a solution of Compound XI in an organic solvent, such as methanol or other lower aliphatic alcohol, containing a strong acid, such as hydrochloric acid, to stand for several hours at room temperature. The addition of water precipitates Compound XIV which is then isolated by filtration.

Compounds XIII and XIV may be treated with a lower aliphatic acid anhydride to provide 3-keto-13β-alkyl-17β-acetyl-gon-4-en-17α-ol acylates and 3-keto-13β-alkyl-17β-acetyl-gona-4,9-dien-17α-ol acylates, respectively. For example, by allowing a solution of Compounds XIII and XIV in a lower aliphatic acid anhydride containing paratoluenesulfonic acid to stand for several hours. The acylates may be isolated by removal of a major part of the anhydride by distillation under reduced pressure, adding water slowly to the reaction mixture to decompose the remaining anhydride, extracting the reaction mixture with ether, washing the ether extract with aqueous sodium bicarbonate solution, and then with water until the washings are neutral, drying the ether solution over anhydrous sodium sulfate, and removing the ether by distillation under reduced pressure.

The 3-alkoxy-13β-alkyl-gona-1,3,5(10)-trien-17-one compounds, having 8β, 9α, 14α, and 17α-hydrogen atoms, may be prepared from known 3-alkoxy-13β-alkyl-gona-1,3,5(10),8,14-pentaen-17-one compounds by a known procedure which is represented by the following series of reaction steps wherein the reactants are designated by chemical formulae in which $R_1$ and $R_2$ have the same significance as above:

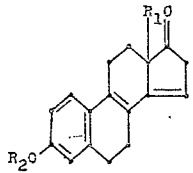
XV

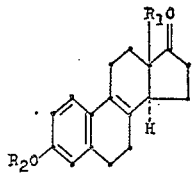
XVI

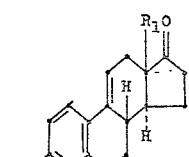
XVII

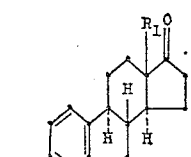
I

The first step in the preparation of the 3-alkoxy-13β-alkyl-gona-1,3,5(10)-trien-17-one compounds is the catalytic hydrogenation of 3-alkoxy-13β-alkyl-gona-1,3,5(10),8,14-pentaen-17-one (Compound XV) in solution in a hydrocarbon solvent, such as benzene or toluene by the use of a catalyst, such as 2% palladised calcium carbonate. The reaction may be conducted at room temperature and is continued until the theoretical amount of hydrogen has been absorbed. The hydrogenation product is 3-alkoxy-13β-alkyl-gona-1,3,5(10),8-tetraen-17-one (Compound XVI).

The second step is the rearrangement of the $\Delta^8$ bond of Compound XVI to the $\Delta^{9(11)}$ position by treatment with methanolic hydrochloric acid. The rearranged product is 3-alkoxy-13β-alkyl-gona-1,3,5(10),9(11)-tetraen-17-one (Compound XVII).

The $\Delta^{9(11)}$ bond of Compound XVII is hydrogenated as a third step. This may be accomplished by shaking an ethanol solution of Compound XVII with hydrogen in the presence of 16% palladised charcoal. The reaction product is 3-alkoxy-13β-alkyl-gona-1,3,5(10)-trien-17-one (Compound I).

The following examples illustrate methods of carrying out the present invention but it is to be understood that these examples are to be given for purposes of illustration and not of limitation.

Example 1.—3-methoxy-13β-isopropyl-gona-1,3,5(10),8-tetraen-17-one

Seventy grams of 3-methoxy-13β-isopropyl-gona-1,3,5(10),8,14-pentaen-17-one in solution in 200 ml. of benzene containing 22.5 g. of 2% palladised calcium carbonate is shaken with hydrogen until 5.7 liters of hydrogen are absorbed. The reaction mixture is filtered and the benzene is removed by distillation under reduced pressure. The residue, 3-methoxy-13β-isopropyl-gona-1,3,5(10),8-tetraen-17-one, is recrystallized from methanol.

Example 2.—3-methoxy-13β-isopropyl-gona-1,3,5(10),9(11)-tetraen-17-one

A solution of 0.25 g. of 3-methoxy-13β-isopropyl-gona-1,3,5(10),8-tetraen-17-one in 100 ml. of methanolic hydorchloric acid is refluxed for forty-five minutes. The solution is then evaporated to dryness under reduced pressure. The residue is 3-methoxy-13β-isopropyl-gona-1,3,5(10),9(11)-tetraen-17-one and is recrystallized from methanol.

Example 3.—3-methoxy-13β-isopropyl-gona-1,3,5(10)-trien-17-one

One gram of 3-methoxy-13β-isopropyl-gona-1,3,5(10),9(11)-tetraen-17-one in 50 ml. ethanol containing 0.5 g. of 10% palladised charcoal is shaken with hydrogen until no more hydrogen is absorbed. The solution is filtered and the alcohol is removed by evaporation under reduced pressure. The residue of 3-methoxy-13β-isopropyl-gona-1,3,5(10)-trien-17-one is recrystallized from methanol.

Example 4.—3-methoxy-13β-isopropyl-17α-ethynylgona-1,3,5(10)-trien-17β-ol

Five grams of 3-methoxy-13β-isopropyl-gona-1,3,5(10)-trien-17-one are added to a saturated acetylene solution prepared by passing a slow stream of acetylene over the surface of a stirred solution of potassium tertiary-amylate containing 5 g. of potassium in solution in 100 ml. tertiary-amyl alcohol, and 100 ml. of ether while the temperature is maintained at 0° C. After the addition is complete, acetylene gas is passed over the reaction mixture for four hours, during which time the temperature of the reaction mixture is maintained at 0° C. and then acetylene gas is passed over the reaction mixture for a period of eighteen hours, during which time the temperature of the reaction mixture is maintained at room temperature. One hundred ml. of 10% aqueous ammonium chloride solution are added to the reaction mixture and the tertiary-amyl alcohol is removed by steam distillation. The reaction product, 3-methoxy-13β-isopropyl-17α-ethylgona-1,3,5(10)-trien-17β-ol is removed by filtration and recrystallized from acetone.

Example 5.— 3-methoxy-13β-isopropyl-17α-ethynylgona-1,3,5(10)-trien-17β-ol acetate Five grams of 3-methoxy - 13β - isopropyl-17α-ethynyl-gona-1,3,5(10)-trien-17β-ol is allowed to stand overnight in solution in 50 ml. of acetic anhydride containing 2 g. of para-toluene-sulfonic acid. The reaction mixture is poured into 200 ml. of water and after one hour the reaction product is removed by filtration and recrystallized from a solution of methanol and ethyl acetate. The crystalline material is 3 - methoxy-13β-isopropyl-17α-ethynylgona - 1,3,5(10)-trien-17β-ol acetate.

Example 6.—3-methoxy-13β-isopropyl-17α-dibromoacetylgona-1,3,5(10)-trien-17β-ol acetate 1.6 grams of N-bromoacetamide is added to a solution of 2 g. of 3-methoxy-13β-isopropyl-17α-ethynylgona-1,3,5(10)-trien-17β-ol acetate in 75 ml. of tertiary-butyl alcohol containing one ml. of water. The reaction product commences to crystallize from the reaction mixture after the reaction mixture has been stirred for a few minutes and after the reaction mixture is stirred for one hour, 25 ml. of water are added. The reaction mixture is cooled to 0° C. and the precipitate is removed by filtration and washed with methanol. The precipitate is 3-methoxy-13β-isopropyl-17α-dibromoacetylgona-1,3,5(10)-trien - 17β-ol acetate and may be recrystallized from methylene chloride-methanol.

Example 7.—3-methoxy-13β-isopropyl-17α-acetylgona-1,3,5(10)-trien-17β-ol acetate 2.75 grams of 3-methoxy - 13β - isopropyl-17α-dibromo-acetylgona-1,3,5(10)-trien-17β-ol acetate in solution in 100 ml. of acetic acid containing 2.5 g. of anhydrous sodium acetate, 10 ml. of water and 3.5 g. of zinc dust is stirred for fifteen minutes on a steam bath. The unreacted zinc is then removed by filtration and sufficient water is added to the reaction mixture to completely precipitate the reaction product. The precipitate is removed by filtration and recrystallized from methanol-ethyl acetate. The reaction product is 3-methoxy-13β-isopropyl-17α-acetyl-gona-1,3,5(10)-trien17β-ol acetate.

Example 8.—3-methoxy-13β-isopropyl-17β-acetyl-gona-1,3,5(10)-triene

A solution of 2.0 g. of 3-methoxy-13β-isopropyl-17α-acetyl-gona-1,3,5(10)-trien-17β-ol acetate in 20 ml. of dry dioxane is added to a solution of 1.0 g. of calcium metal in 300 ml. of liquid ammonia and the mixture is stirred without external cooling for one hour. Five milliliters of methanol are added and after thirty minutes, five grams of ammonium chloride are added. The ammonia is allowed to evaporate, water is added in an amount sufficient to precipitate the reaction product, and the precipitated 3-methoxy-13β-isopropyl-17β-acetyl-gona-1,3,5(10)-triene is removed by filtration and crystallized from ethyl acetate.

Example 9.—3-methoxy-13β-isopropyl-17β-acetyl-gona-1,3,5(10)-triene enol acetate A solution of 0.4 g. of 3-methoxy-13β-isopropyl-17β-acetyl-gona-1,3,5(10)triene and 0.17 g. of para-toluenesulfonic acid in 75 ml. of acetic anhydride is allowed to stand at room temperature for three hours. Most of the acetic anhydride is removed by distillation under reduced pressure. The residual solution is chilled, water is added in an amount sufficient to convert the remaining acetic anhydride to acetic acid and after about ten minutes the product is extracted with ether, the ether solution is washed with sodium bicarbonate solution and with water, dried over sodium sulphate and the ether is removed by distillation under reduced pressure. The residue is dissolved in benzene and passed through a column of aluminum oxide. 3-methoxy-13β-isopropyl-17β-acetyl-gona-1,3,5(10)-triene enol acetate is present in the benzene eluates and crystallizes from the benzene upon concentration.

Example 10.—3-methoxy-13β-isopropyl-17β-acetyl-gona-1,3,5(10)-trien-17α-ol 0.68 gram of perbenzoic acid in 8 ml. of benzene is added to 1.510 grams of finely divided 3-methoxy-13β-isopropyl-17β-acetyl-gona-1,3,5(10)-triene enol acetate. The solution warms spontaneously and is allowed to stand for two hours with cooling to keep the temperature only slightly above room temperature. An equal volume of ether is added, the ether-benzene solution is washed with acidified sodium bisulfite solution, water, aqueous potassium hydroxide solution, and again with water, and the solvents are removed by distillation under reduced pressure. The oily residue is dissolved in 120 ml. 95% ethanol, and 100 ml. of 0.5 N aqueous sodium hydroxide solution are added. The reaction solution is allowed to stand at room temperature for one hour, diluted with an equal volume of ether, washed with water to neutral, dried over sodium sulfate and evaporated to dryness. The residue is 3-methoxy-13β-isopropyl-17β-acetyl-gona-1,3,5(10)-trien-17α-ol, and is crystallized from acetone.

Example 11.—3-methoxy-13β-isopropyl-17β-(1,1-ethylenedioxyethylene)-gona-1,3,5(10)-trien-17α-ol Five grams of 3-methoxy-13β-isopropyl-17β-acetyl-gona-1,3,5(10)-trien-17α-ol is added to a solution prepared by adding 1.6 grams of para-toluenesulfonic acid and 222 ml. of benzene to 34.5 ml. of ethylene glycol. The solution is refluxed for 20 hours under nitrogen. A water separator is used to remove the water from the distillate. The reaction mixture is cooled and saturated sodium bicarbonate solution is added. The benzene layer is separated, washed with water, dried over sodium sulphate and the benzene is removed by distillation under reduced pressure. The residue is 3-methoxy-13β-isopropyl-17β-(1,1-ethylenedioxyethylene) - gona - 1,3,5(10) - trien-17α-ol, and is crystallized from ethanol.

Example 12.—3-methoxy-13β-isopropyl-17β-(1,1-ethylenedioxyethylene)-gona-2,5(10)-dien-17α-ol A solution of two grams of 3-methoxy-13β-isopropyl-17β-(1,1-ethylenedioxyethylene) - gona - 1,3,5(10) - trien-17α-ol in solution in twenty milliliters of dry dioxane is added to a solution of one gram of lithium in 500 ml. of liquid ammonia without external cooling. The reaction mixture is stirred for one hour and then fifty ml. of methanol are added dropwise over a period of 15 minutes. Four grams of finely divided lithium are then added. The reaction mixture is stirred for an additional period of one hour and the ammonia is allowed to evaporate. Water is then added to the reaction mixture in an amount sufficient to precipitate the reaction product, 3-methoxy-13β-isopropyl - 17β - (1,1 - ethylenedioxyethylene) - gona-2,5(10)-dien-17α-ol, which is removed by extraction with ether, drying the ether extract over anhydrous sodium sulfate, and removing the ether by distillation.

Example 13.—3-keto-13β-isopropyl-17β-(1,1-ethylenedioxyethylene)-gon-5(10)-en-17α-ol 3.2 milliliters of glacial acetic acid are added to a solution of 160 mg. of 3-methoxy-13β-isopropyl-17β-(1,1-ethylenedioxyethylene)-gona-2,5(10)-dien-17α-ol in 1.6 ml. of dioxane and 7.2 ml. of absolute ethanol. 1.6 milliliters of water are then added to this solution. The reaction mixture is allowed to stand at room temperature for five hours and then poured into an aqueous solution of sodium bicarbonate containing ice. This solution is allowed to stand until it is basic and then extracted with benzene. The benzene extract is washed with water until the washings are slightly basic and then dried over anhydrous potassium carbonate, filtered, and concentrated under reduced pressure to dryness. The residue is 3-keto-13β - isopropyl - 17β - (1,1 - ethylenedioxyethylene) - gon-5(10)-en-17α-ol, and is crystallized from ether.

Example 14.—3-keto-13β-isopropyl-17β-(1,1-ethylenedioxyethylene)-gona-4,9-dien-17α-ol One molecular equivalent of bromine is added to 100 mg. of 3-keto-13β-isopropyl-17β-(1,1-ethylenedioxyethylene)-gon-5(10)-en-17α-ol in solution in 5 ml. of pyridine. The reaction mixture is stirred for two hours at room temperature, poured into ice water, and the aqueous mixture is extracted with ether. The ether extract is washed with water, dried over anhydrous sodium sulfate, and the ether is removed by distillation under reduced pressure. The residue is 3-keto-13β-isopropyl-17β-(1,1-ethylenedioxyethylene)-gona-4,9-dien-17α-ol.

Example 15.—3-keto-13β-isopropyl-17β-acetyl-gona-4,9-dien-17α-ol

One gram of 3-keto-13β-isopropyl-17β-(1,1-ethylenedioxyethylene)-gona-4,9-dien-17α-ol in solution in 25 ml. methanol containing 2.5 ml. of concentrated hydrochloric acid is stirred for 12 hours at room temperature. Sufficient ethyl acetate is added to the reaction mixture to precipitate the reaction product, 3-keto-13β-isopropyl-17β-acetyl-gona-4,9-dien-17α-ol, which is removed by filtration.

Example 16.—3-keto-13β-isopropyl-17β-acetyl-gon-4-en-17α-ol

One gram of 3-methoxy-13β-isopropyl-17β-(1,1-ethylenedioxyethylene)-gona-2,5(10)-dien-17α-ol in solution in 25 ml. of methanol containing 2.5 ml. of concentrated hydrochloric acid is stirred for 24 hours at room temperature. Fifty ml. of water are added. The precipitate which forms on the addition of water is 3-keto-13β-isopropyl-17β-acetyl-gon-4-en-17α-ol, which is removed by filtration.

Example 17.—3-keto-13β-isopropyl-17β-acetyl-gon-4-en-17α-ol

One gram of 3-keto-13β-isopropyl-17β-(1,1-ethylenedioxyethylene)-gon-5(10)-en-17α-ol in solution in 25 ml.

of methanol containing 2.5 ml. of concentrated hydrochloric acid is allowed to stand for six hours at room temperature. Ethyl acetate in an amount sufficient to precipitate the reaction product is added. The precipitate, 3-keto-13β-isopropyl - 17β - acetyl-gon-4-en-17α-ol, is removed by filtration.

Example 18.—3-keto-13β-isopropyl-17β-acetyl-gon-4-en-17α-ol acetate 2.0 grams of 3-keto-13β-isopropyl-17β-acetyl-gon-4-en-17α-ol are dissolved in 20 ml. of acetic anhydride containing 0.6 gram of para-toluenesulfonic acid. The reaction mixture is allowed to stand at room temperature for three hours. The major amount of the acetic anhydride is removed by distillation under reduced pressure. Water is slowly added to the reaction mixture in an amount sufficient to decompose any remaining acetic anhydride. The reaction mixture is washed with aqueous sodium bicarbonate solution and then with water until the washings are neutral. The ether solution is dried over sodium sulphate and the ether is removed by distillation under reduced pressure. The residue is 3-keto-13β-isopropyl-17β-acetyl-gon-4-en-17α-ol acetate.

Example 19.—3-keto-13β-isopropyl-17β-acetyl-gona-4,9-dien-17α-ol acetate 2.0 grams of 3-keto-13β-isopropyl-17β-acetyl-gona-4,9-dien-17α-ol are dissolved in 20 ml. of acetic anhydride containing 0.6 gram of para-toluenesulfonic acid. The reaction mixture is allowed to stand at room temperature for three hours. The major amount of acetic anhydride is removed by distillation under reduced pressure and water is then slowly added to the reaction mixture in an amount sufficient to decompose any remaining acetic anhydride. The reaction mixture is washed with aqueous sodium bicarbonate solution and then with water until the washings are neutral. The ether solution is dried over anhydrous sodium sulphate and the ether is removed by distillation under reduced pressure. The residue is 3-keto-13β-isopropyl-17β-acetyl-gona-4,9-dien-17α-ol acetate.

Example 20.—3-methoxy-13β-methyl-17α-ethylnyl-gona-1,3,5(10)-trien-17β-ol

Five grams of 3-methoxy-13β-methyl-gona-1,3,5(10)-trien-17-one are added to a saturated acetylene solution prepared by passing a slow stream of acetylene over the surface of a stirred solution of potassium tertiary-amylate containing 5 g. of potassium in solution in 100 ml. tertiary-amyl alcohol, and 100 ml. of ether while the temperature is maintained at 0° C. After the addition is complete, acetylene gas is passed over the reaction mixture for four hours, during which time the temperature of the reaction mixture is maintained at 0° C. and then acetylene gas is passed over the reaction mixture for a period of eighteen hours, during which time the temperature of the reaction mixture is maintained at room temperature. One hundred ml. of 10% aqueous ammonium chloride solution are added to the reaction mixture and the tertiary-amyl alcohol is removed by steam distillation. The reaction product, 3-methoxy-13β-methyl-17α - ethynylgona-1,3,5(10)-trien-17β-ol, is removed by filtration and recrystallized from acetone.

Example 21.—3-methoxy-13β-methyl-17α-ethynyl-gona-1,3,5(10)-trien-17β-ol acetate Five grams of 3-methoxy-13β-methyl-17α-ethynylgona-1,3,5(10)-trien-17β-ol is allowed to stand overnight in solution in 50 ml. of acetic anhydride containing 2 g. of para-toluenesulfonic acid. The reaction mixture is poured into 200 ml. of water and after one hour the reaction product is removed by filtration and recrystallized from a solution of methanol and ethyl acetate. The crystalline material is 3-methoxy-13β-methyl-17α - ethynylgona-1,3,5(10)-trien-17β-ol acetate.

Example 22.—3-methoxy-13β-methyl-17α-dibromo-acetylgona-1,3,5(10)-trien-17β-ol acetate 1.6 grams of N-bromoacetamide is added to a solution of 2 g. of 3-methoxy-13β-methyl-17α-ethynylgona-1,3,5(10)-trien-17β-ol acetate in 75 ml. of tertiary-butyl alcohol containing one ml. of water. The reaction product commences to crystallize from the reaction mixture after the reaction mixture has been stirred for a few minutes and after the reaction mixture is stirred for one hour, 25 ml. of water are added. The reaction mixture is cooled to 0° C. and the precipitate is removed by filtration and washed with methanol. The precipitate is 3-methoxy-13β-methyl-17α-dibromoacetylgona-1,3,5(10) - trien - 17β-ol acetate and may be recrystallized from methylene chloride-methanol.

Example 23.—3-methoxy-13β-methyl-17α-acetyl-gona-1,3,5(10)-trien-17β-ol acetate 2.75 grams of 3-methoxy-13β-methyl - 17α-dibromo-acetylgona-1,3,5(10)-trien-17β-ol acetate in solution in 100 ml. of acetic acid containing 2.5 g. of anhydrous sodium acetate, 10 ml. of water and 3.5 g. of zinc dust is stirred for fifteen minutes on a steam bath. The unreacted zinc is then removed by filtration and sufficient water is added to the reaction mixture to completely precipitate the reaction product. The precipitate is removed by filtration and recrystallized from methanol-ethyl acetate. The reaction product is 3-methoxy-13β-methyl-17α-acetylgona-1,3,5(10)-trien-17β-ol acetate.

Example 24.—3-methoxy-13β-methyl-17β-acetyl-gona-1,3,5(10)-triene

A solution of 2.0 g. of 3-methoxy-13β-methyl-17α-acetyl-gona-1,3,5(10)-trien-17β-ol acetate in 20 ml. of dry dioxane is added to a solution of 1.0 g. of calcium metal in 300 ml. of liquid ammonia and the mixture is stirred without external cooling for one hour. Five milliliters of methanol are added and after thirty minutes, five grams of ammonium chloride are added. The ammonia is allowed to evaporate, water is added in an amount sufficient to precipitate the reaction product, and the precipitated 3-methoxy-13β-methyl-17β-acetyl - gona-1,3,5(10)-triene is removed by filtration and crystallized from ethyl acetate.

Example 25.—3-methoxy-13β-methyl-17β-acetyl-gona-1,3,5(10)-triene enol acetate

A solution of 0.4 g. of 3-methoxy-13β-methyl-17β-acetyl-gona-1,3,5(10)-triene and 0.17 g. of para-toluenesulfonic acid in 75 ml. of acetic anhydride is allowed to stand at room temperature for three hours. Most of the acetic anhydride is removed by distillation under reduced pressure. The residual solution is chilled, water is added in an amount sufficient to convert the remaining acetic anhydride to acetic acid and after about ten minutes the product is extracted with ether, the ether solution is washed with sodium carbonate solution and with water, dried over sodium sulphate and the ether is removed by distillation under reduced pressure. The residue is dissolved in benzene and passed through a column of aluminum oxide. 3-methoxy-13β-methyl-17β-acetyl-gona-1,3,5(10)-triene enol acetate is present in the benzene eluates and crystallizes from the benzene upon concentration.

Example 26.—3-methoxy-13β-methyl-17β-acetyl-gona-1,3,5(10)-trien-17α-ol 0.68 gram of perbenzoic acid in 8 ml. of benzene is added to 1.510 grams of finely divided 3-methoxy-13β-methyl-17β-acetyl-gona-1,3,5(10)-triene enol acetate. The solution warms spontaneously and is allowed to stand for two hours with cooling to keep the temperature only slightly above room temperature. An equal volume of ether is added, the ether-benzene solution is washed with acidified sodium bisulfite solution, water, aqueous potassium hydroxide solution, and again with water, and the solvents are removed by distillation under reduced pressure. The oily residue is dissolved in 120 ml. of 95% ethanol, and 100 ml. of 0.5 N aqueous sodium hydroxide solution are added. The reaction solution is allowed to stand at room temperature for one hour, diluted with an equal volume of ether, washed with water to neutral, dried over sodium sulfate and evaporated to dryness. The residue is 3-methoxy-13β-methyl-17β-acetyl-gona-1,3,5(10)-trien-17α-ol, is crystallized from acetone.

Example 27.—3-methoxy-13β-methyl-17β-(1,1-ethylenedioxyethylene)-gona-1,3,5(10)-trien-17α-ol Five grams of 3-methoxy-13β-methyl-17β-acetyl-gona-1,3,5(10)-trien-17α-ol is added to a solution prepared by adding 1.6 grams of para-toluenesulfonic acid and 222 ml. of benzene to 34.5 ml. of ethylene glycol. The solution is refluxed for 20 hours under nitrogen. A water separator is used to remove the water from the distillate. The reaction mixture is cooled and saturated sodium bicarbonate solution is added. The benzene layer is separated, washed with water, dried over sodium sulphate and the benzene is removed by distillation under reduced pressure. The residue is 3-methoxy-13β-methyl-17β-(1,1-ethylenedioxyethylene)-gona - 1,3,5(10) - trien - 17α - ol and is crystallized from ethanol.

Exampl 28.—3-methoxy-13β-methyl-17β-(1,1-ethylenedioxyethylene)-gona-2,5(10)-dien-17β-ol A solution of two grams of 3-methoxy-13β-methyl-17β - (1,1 - ethylenedioxyethylene) - gona - 1,3,5(10)-trien-17α-ol in solution in twenty milliliters of dry dioxane is added to a solution of one gram of lithium in 500 ml. of liquid ammonia without external cooling. The reaction mixture is stirred for one hour and then fifty ml. of methanol are added dropwise over a period of 15 minutes. Four grams of finely divided lithium are then added. The reaction mixture is stirred for an additional period of one hour and the ammonia is allowed to evaporate. Water is then added to the reaction mixture in an amount sufficient to precipitate the reaction product, 3 - methoxy - 13β - methyl - 17β - (1,1 - ethylenedioxyethylene) - gona - 2,5(10) - dien - 17α - ol, which is removed by extraction with ether, drying the ether extract over anhydrous sodium sulfate, and removing the ether by distillation.

Example 29.—3-keto-13β-methyl-17β-(1,1-ethylenedioxyethylene)-gon-5(10)-en-17α-ol 3.2 milliliters of glacial acetic acid are added to a solution of 160 mg. of 3-methoxy-13β-methyl-17β-(1,1-ethylenedioxyethylene) - gona - 2,5(10) - dien - 17α - ol in 1.6 ml. of dioxane and 7.2 ml. of absolute ethanol. 1.6 milliliters of water are then added to this solution. The reaction mixture is allowed to stand at room temperature for five hours and then poured into an aqueous solution of sodium bicarbonate containing ice. This solution is allowed to stand until it is basic and then extracted with benzene. The benzene extract is washed with water until the washings are slightly basic and then dried over anhydrous potassium carbonate, filtered, and concentrated under reduced pressure to dryness. The ersidue is 3-keto-13β - methyl - 17β - (1,1 - ethylenedioxyethylene) - gon-5(10)-en-17β-ol, and is crystallized from ether.

Example 30.—3-keto-13β-methyl-17β-(1,1-ethylenedioxyethylene)-gona-4,9-dien-17α-ol One molecular equivalent of bromine is added to 100 mg. of 3-keto-13β-methyl-17β-(1,1-ethylenedioxyethylene)-gon-5(10)en-17α-ol in solution in 5 ml. of pyridine. The reaction mixture is stirred for two hours at room temperature, poured into ice water, and the aqueous mixture is extracted with ether. The ether extract is washed with water, dried over anhydrous sodium sulfate, and the ether is removed by distillation under reduced pressure. The residue is 3-keto-13β-methyl-17β-(1,1-ethylenedioxyethylene)-gona-4,9-dien-17α-ol.

Example 31.—3-keto-13β-methyl-17β-acetyl-gona-4,9-dien-17α-ol

One gram of 3-keto-13β-methyl-17β-(1,1-ethylenedioxyethylene)-gona-4,9-dien-17α-ol in solution in 25 ml. methanol containing 2.5 ml. of concentrated hydrochloric acid is stirred for 12 hours at room temperature. Sufficient ethyl acetate is added to the reaction mixture to precipitate the reaction produce, 3-keto-13β-methyl-17β-acetyl-gona-4,9-dien-17α-ol, which is removed by filtration.

Example 32.—3-keto-13β-methyl-17β-acetyl-gon-4-en-17α-ol

One gram of 3-methoxy-13β-methyl-17β-(1,1-ethylenedioxyethylene)-gona-2,5(10)-dien-17α-ol in solution in 25 ml. of methanol containing 2.5 ml. of concentrated hydrochloric acid is stirred for 24 hours at room temperature. Fifty ml. of water are added. The precipitate which forms on the addition of water is 3-keto-13β-methyl-17β-acetyl-gon-3-en-17α-ol, which is removed by filtration.

Example 33.—3-keto-13β-methyl-17β-acetyl-gon-4-en-17α-ol

One gram of 3-keto-13β-methyl-17β-(1,1-ethylenedioxyethylene)-gon-5(10)-en-17α-ol in solution in 25 ml. of methanol containing 2.5 ml. of concentrated hydrochloric acid is allowed to stand for six hours at room temperature. Ethyl acetate in an amount sufficient to precipitate the reaction product is added. The precipitate, 3-keto-13β-methyl - 17β - acetyl - gon-4-en-17α-ol, is removed by filtration.

Example 34.—3-keto-13β-methyl-17β-acetyl-gon-4-en-17α-ol acetate 2.0 grams of 3-keto-13β-methyl-17β-acetyl-gon-4-en-17α-ol are dissolved in 20 ml. of acetic anhydride containing 0.6 grams of para-toluenesulfonic acid. The reaction mixture is allowed to stand at room temperature for three hours. The major amount of the acetic anhydride is removed by distillation under reduced pressure. Water is slowly added to the reaction mixture in an amount sufficient to decompose any remaining acetic anhydride. The reaction mixture is washed with aqueous sodium bicarbonate solution and then with water until the washings are neutral. The ether solution is dried over sodium sulphate and the ether is removed by distillation under reduced pressure. The residue is 3-keto-13β-methyl-17β-acetyl-gon-4-en-17α-ol acetate.

Example 35.—3-keto-13β-methyl-17β-acetyl-gona-4,9-dien-17α-ol acetate 2.0 grams of 3-keto-13β-methyl-17β-acetyl-gona-4,9-dien-17α-ol are dissolved in 20 ml. of acetic anhydride containing 0.6 gram of para-toluenesulfonic acid. The reaction mixture is allowed to stand at room temperature for three hours. The major amount of acetic anhydride is removed by distillation under reduced pressure and water is then slowly added to the reaction mixture in an amount sufficient to decompose any remaining acetic anhydride. The reaction mixture is washed with aqueous sodium bicarbonate solution and then with water until the washings are neutral. The ether solution is dried over anhydrous sodium sulphate and the ether is removed by distillation under reduced pressure. The residue is 3-keto-13β-methyl-17β-acetyl-gona-4,9-dien-17α-ol acetate.

Various changes and modifications may be made in carrying out the present invention without departing from the spirit and scope thereof. Insofar as these changes and modifications are within the purview of the annexed claims, they are to be considered as part of our invention.

What is claimed is:

1. A process for the preparation of 3-lower alkoxy-13β-lower alkyl-17β-acetyl-gona-1,3,5(10)-triene which comprises reducing 3-lower alkoxy-13β-lower alkyl-17α-acetyl-gona-1,3,5(10)-triene-17β-ol acetate with calcium in liquid ammonia.

2. A process for the preparation of 3-lower alkoxy-13β-lower alkyl-17β-acetyl-gona-1,3,5(10)-triene which comprises reducing 3-lower alkoxy-13β-lower alkyl-17α-acetyl-gona-1,3,5(10)-triene-17β-ol acetate with acetic acid and zinc dust.

3. A process for the preparation of 3-lower alkoxy-13β-lower alkyl-17β-acetyl-gona-1,3,5(10) - triene-17α-ol which comprises oxidizing the enol acetate of 3-lower alkoxy-13β-lower alkyl-17β-acetyl-gona-1,3,5(10)-triene with perbenzoic acid to form an intermediate 17α,20-epoxide and saponifying the epoxide.

4. A process for the preparation of 3-keto-13β-lower alkyl-17β-acetyl-gona-4,9-dien-17α-ol, which comprises the steps of: reducing 3-lower alkoxy-13β-lower alkyl-17α-acetyl-gona-1,3,5(10)-trien-17β-ol acetate with calcium in liquid ammonia, to provide 3-lower alkoxy-13β-lower alkyl-17β-acetyl-gona-1,3,5(10)-triene; treating the latter compound with acetic anhydride containing para-toluenesulfonic acid, to provide the enol acetate of 3-lower alkoxy-13β-lower alkyl-17β-acetyl-gona-1,3,5(10)-triene; oxidizing the latter compound with perbenzoic acid, to form an intermediate 17α,20-epoxide and saponifying the epoxide, to provide 3-lower alkoxy-13β-lower alkyl-17β-acetyl-gona-1,3,5(10)-trien-17α-ol; treating the latter compound with ethylene glycol and para-toluenesulfonic acid, to provide 3-lower alkoxy-13β-lower alkyl-17β-(1,1 - ethylenedioxyethylene)-gona - 1,3,5(10)-trien-17α-ol; reducing the latter compound with lithium in liquid ammonia, to provide 3-lower alkoxy-13β-lower alkyl-17β-(1,1-ethylenedioxyethylene) - gona - 2,5(10)-dien-17α-ol; treating the latter compound with a weak organic acid selected from the group consisting of oxalic and lower alkanoic acids, to provide 3-keto-13β-lower alkyl-17β-(1,1-ethylenedioxyethylene) - gon - 5(10) - en-17α-ol; treating the latter compound with bromine in pyridine solution, to provide 3-keto-13β-lower alkyl-17β-(1,1-ethylenedioxyethylene)-gona-4,9-dien-17α - ol; and treating the latter compond with methanolic hydrochloric acid.

5. A process for the preparation of 3-keto-13β-lower alkyl-17β-acetyl-gon-4-en-17α-ol, which comprises the steps of: reducing 3-lower alkoxy-13β-lower alkyl-17α-acetyl-gona-1,3,5(10)-trien-17β-ol acetate with calcium in liquid ammonia, to provide 3-lower alkoxy-13β-lower alkyl-17β-acetyl-gona-1,3,5(10)-triene; treating the latter compound with acetic anhydride containing paratoluenesulfonic acid to provide the enol acetate of 3-lower alkoxy-13β-lower alkyl-17β-acetyl-gona-1,3,5(10)-triene; oxidizing the latter compound with perbenzoic acid, to form an intermediate 17α,20-epoxide and saponifying the epoxide, to provide 3-lower alkoxy-13β-lower alkyl-17β-acetyl-gona-1,3,5(10)-trien-17α-ol; treating the latter compound with ethylene glycol and para-toluenesulfonic acid, to provide 3-lower alkoxy-13β-lower alkyl-17β-(1,1-ethylenedioxyethylene)-gona-1,3,5(10)-trien-17α-ol; reducing the latter compound with lithium in liquid ammonia, to provide 3-lower alkoxy-13β-lower alkyl-17β-(1,1-ethylenedioxyethylene)-gona-2,5(10)-dien-17α-ol; and treating the latter compound with methanolic hydrochloric acid.

6. A process for the preparation of 3-keto-13β-lower alkyl-17β-acetyl-gon-4-en-17α-ol, which comprises the steps of: reducing 3-lower alkoxy-13β-lower alkyl-17α-acetyl-gona-1,3,5(10)-trien-17β-ol acetate with calcium in liquid ammonia, to provide 3-lower alkoxy-13β- lower alkyl-17β-acetyl-gona-1,3,5(10)-triene; treating the latter compound with acetic anhydride containing para-toluenesulfonic acid to provide the enol acetate of 3-lower alkoxy-13β-lower alkyl-17β-acetyl-gona-1,3,5(10)-triene; oxidizing the latter compound with perbenzoic acid, to form an intermediate 17α,20-epoxide and saponifying the epoxide, to provide 3-lower alkoxy-13β-lower alkyl-17β-acetyl-gona-1,3,5(10)-trien-17α-ol; treating the latter compound with ethylene glycol and para-toluenesulfonic acid, to provide 3-lower alkoxy-13β-lower alkyl-17β-(1,1-ethylenedioxyethylene)-gona-1,3,5(10)-trien-17α-ol; reducing the latter compound with lithium in liquid ammonia to provide 3-lower alkoxy-13β-lower alkyl-17β-(1,1-ethylenedioxyethylene)-gona-2,5(10)-dien-17α-ol; treating the latter compound with a weak organic acid selected from the group consisting of oxalic and lower alkanoic acids to provide 3-keto-13β-lower alkyl-17β-(1,1-ethylenedioxyethylene)-gon-5(10)-en-17α-ol; and treating the latter compound with a strong mineral acid.

7. A method for the preparation of 3-keto-13β-lower alkyl-17β-acetyl - gona - 4,9 - dien-17α-ol lower acylate, which comprises the steps of: reducing 3-lower alkoxy-13β-lower alkyl-17α-acetyl - gona-1,3,5(10)-trien-17β-ol acetate with calcium in liquid ammonia to provide 3-lower alkoxy-13β-lower alkyl-17β-acetyl-gona-1,3,5(10)-triene; treating the latter compound with acetic anhydride containing para-toluenesulfonic acid, to provide the enol acetate of 3-lower alkoxy-13β-lower alkyl-17β-acetyl-gona-1,3,5(10)-triene; oxidizing the latter compound with perbenzoic acid, to form an intermediate 17α,20-epoxide and saponifying the epoxide, to provide 3-lower alkoxy-13β-lower alkyl-17β acetyl-gona-1,3,5(10)-trien-17α-ol; treating the latter compound with ethylene glycol and para-toluenesulfonic acid, to provide 3-lower alkoxy-13β-lower alkyl-17β-(1,1-ethylenedioxyethylene) - gona-1,3,5 (10)-trien-17α-ol; reducing the latter compound with lithium in liquid ammonia, to provide 3-lower alkoxy-13β-lower alkyl - 17β - (1,1-ethylenedioxyethylene)-gona-2,5 (10)-dien-17α-ol; treating the latter compound with a weak organic acid selected from the group consisting of oxalic and lower alkanoic acids, to provide 3-keto-13β-lower alkyl-17β-(1,1-ethylenedioxyethylene)-gon-5(10)-en-17α-ol; treating the latter compound with bromine in pyridine solution to provide 3-keto-13β-lower alkyl-17β-(1,1-ethylenedioxyethylene) - gona-4,9-dien-17α-ol; treating the latter compound with methanolic hydrochloric acid, to provide 3-keto-13β-lower alkyl-17β-acetyl-gona-4,9-dien-17α-ol; and treating the latter compound with a lower aliphatic acid anhydride containing para-toluenesulfonic acid.

8. A method for the preparation of 3-keto-13β-lower alkyl-17β-acetyl-gon-4-en-17α-ol lower acylate, which comprises the steps of: reducing 3-lower alkoxy-13β-lower alkyl-17α-acetyl-gona-1,3,5(10)-trien-17β-ol acetate with calcium in liquid ammonia, to provide 3-lower alkoxy-13β-lower alkyl-17β-acetyl-gona-1,3,5(10)-triene; treating the latter compound with acetic anhydride containing para-toluenesulfonic acid, to provide the enol acetate of 3-lower alkoxy-13β-lower alkyl - 17β - acetyl-gona-1,3,5 (10)-triene; oxidizing the latter compound with perbenzoic acid, to form an intermediate 17α,20-epoxide and saponifying the epoxide, to provide 3-lower alkoxy-13β-lower alkyl-17β-acetyl-gona-1,3,5(10)-trien-17α-ol; treating the latter compound with ethylene glycol and para-toluenesulfonic acid, to provide 3-lower alkoxy-13β-lower alkyl-17β-(1,1 - ethylenedioxyethylene)-gona - 1,3,5(10)-trien-17α-ol; reducing the latter compound with lithium in liquid ammonia, to provide 3-lower alkoxy-13β-lower alkyl-17β-(1,1 - ethylenedioxyethylene) - gona - 2,5(10)-dien-17α-ol; treating the latter compound with methanolic hydrochloric acid, to provide 3-keto-13β-lower alkyl-17β-acetyl-gon-4-en-17α-ol; and treating the latter compound with a lower aliphatic acid anhydride containing para-toluenesulfonic acid.

9. A method for the preparation of 3-keto-13β-lower alkyl-17β-acetyl-gon-4-en-17α-ol, which comprises the steps of: reducing 3-lower alkoxy-13β-lower alkyl-17α-acetyl-gona-1,3,5(10)-trien-17β-ol acetate with calcium in liquid ammonia, to provide 3-lower alkoxy-13β-lower alkyl-17β-acetyl-gona-1,3,5(10)-triene; treating the latter compound with acetic anhydride containing paratoluenesulfonic acid, to provide the enol acetate of 3-lower alkoxy-13β-lower alkyl-17β-acetyl-gona-1,3,5(10)-triene; oxidizing the latter compound with perbenzoic acid, to form an intermediate 17α,20-epoxide and saponifying the epoxide, to provide 3-lower alkoxy-13β-lower alkyl-17β-acetyl-gona-1,3,5(10)-trien-17α-ol; treating the latter compound with ethylene glycol and para-toluenesulfonic acid, to provide 3-lower alkoxy-13β-lower alkyl-17β-(1,1-ethylenedioxyethylene)-gona-1,3,5(10)-trien-17α-ol; reducing the latter compound with lithium in liquid ammonia, to provide 3-lower alkoxy-13β-lower alkyl-17β-(1,1-ethylenedioxyethylene)-gona-2,5(10)-dien-17α-ol; treating the latter compound with a weak organic acid selected from the group consisting of oxalic and lower alkanoic acids, to provide 3-keto-13β-lower alkyl-17β-(1,1-ethylenedioxyethylene)-gon-5(10)-en-17α-ol; treating the latter compound with a strong acid to provide 3-keto-13β-lower alkyl-17β-acetyl-gon-4-en-17α-ol; and treating the latter compound with a lower aliphatic acid anhydride containing para-toluenesulfonic acid.

10. A compound of the formula:

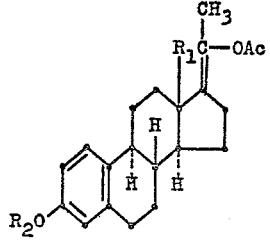

wherein $R_1$ and $R_2$ are each lower alkyl.

11. A compound of the formula:

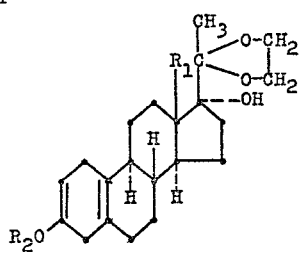

wherein $R_1$ and $R_2$ are each lower alkyl.

12. A compound of the formula:

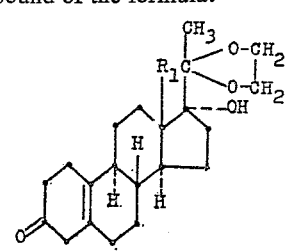

wherein $R_1$ is lower alkyl.

13. A compound of the formula:

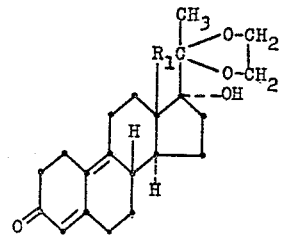

wherein $R_1$ is lower alkyl.

14. A compound of the formula:

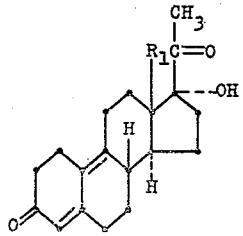

wherein $R_1$ is lower alkyl.

15. A compound of the formula:

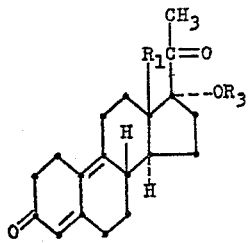

wherein $R_1$ is lower alkyl and $R_3$ is lower alkanoyl.

16. 3-keto-13β-methyl-17β-acetyl-17α-acetoxy-gona-4,9-diene.

References Cited
UNITED STATES PATENTS

| | | | |
|---|---|---|---|
| 3,079,382 | 2/1963 | Camerino et al. | 260—239.55 |
| 3,096,353 | 7/1963 | Fried et al. | 260—397.4 |
| 3,126,374 | 3/1964 | Ringold et al. | 260—239.55 |
| 3,231,567 | 1/1966 | Ercoli et al. | 260—397.4 |
| 3,243,433 | 3/1966 | Fried et al. | 260—397.4 |
| 3,250,793 | 5/1966 | Fried et al. | 260—397.4 |
| 3,248,390 | 4/1966 | Bowers et al. | 260—397.4 |
| 3,257,391 | 6/1966 | Bowers et al. | 260—397.4 |
| 3,277,123 | 10/1966 | Tokutake | 260—397.4 |

LEWIS GOTTS, *Primary Examiner.*

J. R. BROWN, *Assistant Examiner.*